Dec. 8, 1936.    H. C. DAVIS    2,063,490
METHOD OF MAKING AN EXPANSION JOINT
Filed Dec. 4, 1934
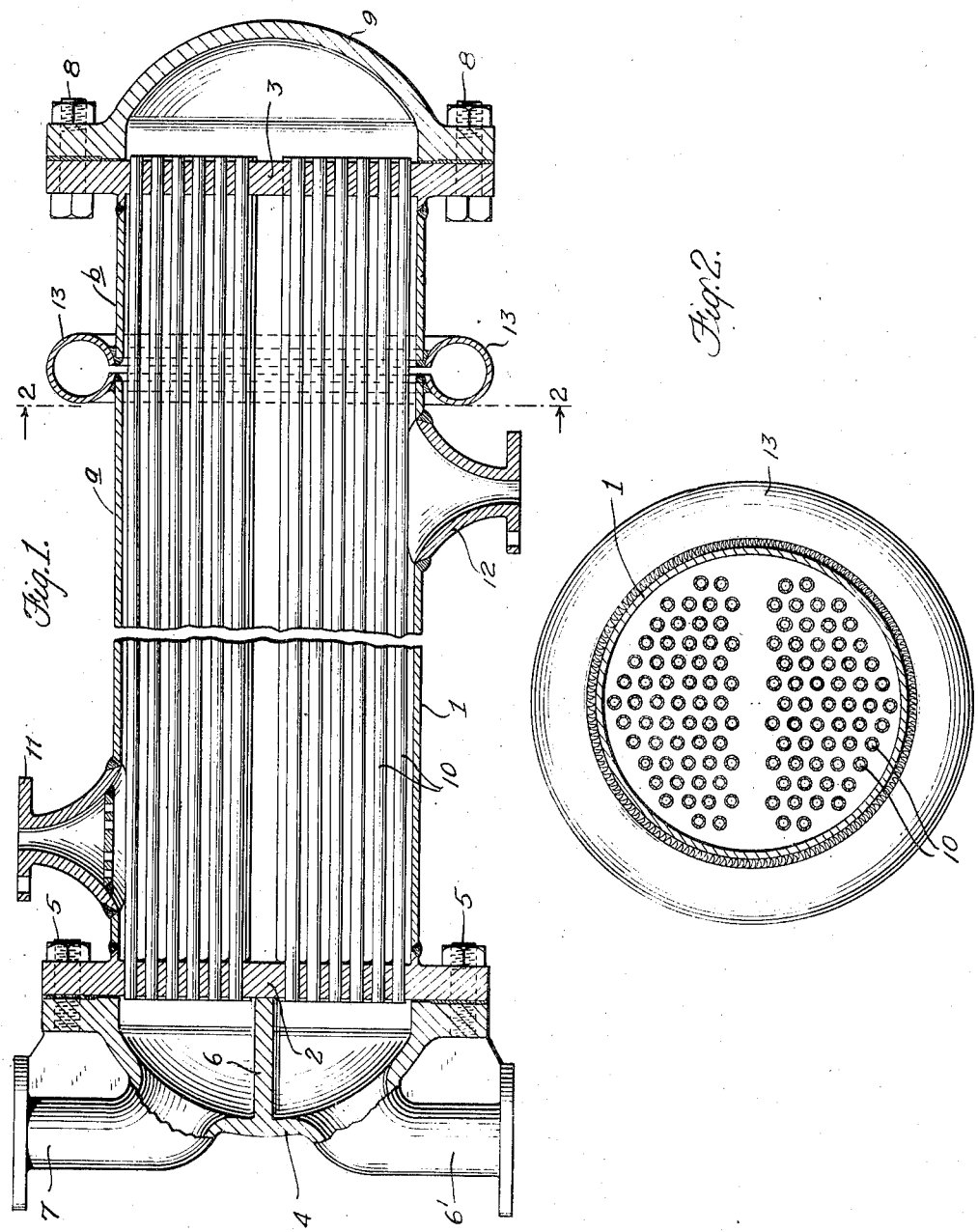
INVENTOR
HOWARD C. DAVIS
BY
ATTORNEY Patented Dec. 8, 1936

2,063,490

UNITED STATES PATENT OFFICE 2,063,490

METHOD OF MAKING AN EXPANSION JOINT

Howard C. Davis, Elizabeth, N. J., assignor to Davis Engineering Corporation, a corporation of Delaware Application December 4, 1934, Serial No. 755,868

4 Claims. (Cl. 29—157.4)

The invention herein disclosed relates to a method of making an expansion joint for absorbing linear changes of a member that is subjected to conditions that cause the member to expand and contract and comprehends a method for providing such member with an expansion joint.

An object of the invention is to provide an expansion joint for such members which does not have certain defects inherent in many of the expansion joints now in use and which has certain advantages hereinafter enumerated which, collectively, are not common to the expansion joints heretofore used and some of which are novel in an expansion joint.

In accordance with the invention, two otherwise separated sections of a member subject to varying or different temperatures are connected together by a tubular element. The tubular element is secured to the adjacent ends of the separated or otherwise disconnected sections in overlapping relation and the wall of the tubular element is cut between its connections to the ends of the sections of the member. The tubular element joining the sections of the member expands and contracts in accordance with linear changes in the member, and in fluid containers provides a fluid-tight joint between the sections thereof.

One embodiment of the expansion joint as applied to a heat exchanger is illustrated in the accompanying drawing in which:

Fig. 1 is a longitudinal, sectional elevation of the heat exchanger; and

Fig. 2 is a transverse section of the same taken along the line 2—2 of Fig. 1.

The heat exchanger illustrated in the drawing consists of a cylindrical shell 1 in two sections $a$ and $b$. The section $a$ has an end plate 2 which forms a tube sheet and which extends beyond the external surface of the shell and forms a flange. The section $b$ has a similar plate 3. To the plate $a$ there is secured a head 4 by means of bolts 5. The head 4 has a central baffle 6 which extends between the head and the plate 2. Inlet and outlet pipes 6' and 7 are formed integral with the head and communicate with the interior of the head on opposite sides of the baffle 6. To the plate 3 on the section $b$, there is secured by means of bolts 8 a head 9. Extending between the plates 2 and 3 there are a series of tubes 10 the ends of which are expanded into openings in the plates 2 and 3. The medium to be heated passes through the inlet pipe 6' through the tubes in the lower portion of the heat exchanger into the head 9 and back through the upper tubes to the upper chamber in the head 4 and out through the outlet.

The shell of the exchanger is provided with a flanged steam connection 11 and a flanged drain 12. The steam connection and the drain communicate with the interior of the shell and steam is admitted to the shell through the connection 11 and the water of condensation is removed through the connection 12. Thus, the heat of the steam is transferred to the oil passing through the tubes. The different temperatures prevailing in the heat exchanger causes the container and the tubes to expand and contract. This expansion and contraction is taken up by an expansion joint connecting the sections $a$ and $b$ of the shell.

The adjacent ends of the sections $a$ and $b$ of the shell of the heat exchanger are connected together by a tubular element 13. The tubular element is bent in shape in accordance with the perimeter of the shell, in this instance circular, and embraces the shell overlapping the space between the adjacent ends of the sections $a$ and $b$ of the shell. The tube 13 is circular in cross section and it is endless. The surface of the tubular element is tangential to the surface of the sections $a$ and $b$ of the shell and the wall of the tubular element is welded to the ends of the sections $a$ and $b$. Between the connections of the wall of the tubular element 13 to the ends of the sections $a$ and $b$ of the shell of the heat exchanger, the wall of the tubular element is cut so that a continuous slot is formed in the tubular element.

Any elongation or contraction of the shell and particularly with reference to the tubes 10 will be absorbed by this tubular element which forms an expansion joint. This expansion joint has several advantages some of which are as follows: The cross section of the tubular element being a true circle, the internal pressures to which the tubular element are subjected, that is, in the heat exchanger illustrated the vapor pressure of the steam or atmospheric pressure, is uniformly distributed within the tube and the desired thickness of the tube may be calculated in accordance with accepted formula. When a safety factor is allowed comparable with the safety factor employed in calculating the size of the shell of the heat exchanger, it will be found that the thickness required of the tubular element will be much less than the necessary thickness of the metal used for the shell. This is a desirable feature because it lessens the rigidity of the expansion member and conversely increases the resiliency thereof, making it more suitable for absorbing the linear changes in the shell of the heat exchanger due to contraction and expansion. The fact that the tubular member is tangential to the shell of the heat exchanger at the lines of contact results in securing a weld of maximum strength both under compression and in tension. The fact that the tubular element is circular in cross section and is connected to the shell tangentially, causes the stresses and strains due to the bending of the tubular element by virtue of the contraction and expansion of the shell to be progressively distributed circumferentially of the tubular element and thus avoids a crystallization or fatigue of the material which is a common complaint of expansion joints heretofore in use due to the concentration of the stresses and strains in a particular section of the expansion member.

The expansion joint described above may be constructed in several ways but the following methods have been found suitable: Two pieces of a tubular element of the required diameter and thickness may be bent into semi-circular shapes of an inner radius equal to the radius of the shell. The ends of these two sections are then welded together so as to form an endless ring. The ring so formed is secured to the adjacent ends of the sections of the member for which the expansion joint is required, as by welding or brazing. After the tubular element has been welded to the adjacent ends of the sections of the member, the wall of the tubular element is cut between its connections to the sections of the member.

Another way in which the tubular element may be formed for circular shells is to coil a tubular element of the required diameter and thickness in the form of a helix having more than one convolution and an inner radius of gyration equal to the radius of the heat exchanger shell. The helical coil of tubing is then cut so as to separate the convolutions. The ends of each convolution are then brought together and butt-welded or brazed so that an endless circular tubular element is formed. This tubular element is then secured to the member and the wall thereof cut as previously described.

In applying this expansion joint to heaters, such as that disclosed, it has been found desirable to expand the tubes into the tube sheets with the tubular element of the expansion joint contracted. For a given thickness of material and a given diameter of the tubular element of the expansion joint, the tubular element will take a permanent set when elongated or contracted beyond a definite predeterminable amount. It has been found that this limit is the same in contraction as in expansion. In order to secure the maximum limit for the expansion, in the case of a heater, the tubular element of the expansion joint is contracted and while so contracted, the tubes of the water heater are expanded into the tube sheets. This is done at ordinary atmospheric temperatures and the heater operates between room temperatures and elevated temperatures. Thus, by contracting the tubular member of the expansion joint when the tubes of the water heater are expanded into the tube sheet, there is obtained in the expansion joint a limit of expansion which is double that which would be obtained if the tubular member of the expansion joint were not contracted at room temperatures.

It will be apparent that the expansion joint can be made with various commercial tubings that are sold in a variety of sizes, that the tubular element may be secured to the inside of the shell, in which case the external diameter of the coiled tubular element will be equal to the internal diameter of the shell, and that the tubular element may be connected to flanges on the otherwise separated sections of a member rather than directly to a shell.

It will thus be obvious that various changes may be made by those skilled in the art both in the details of construction of the expansion joint and the method for providing a member with an expansion joint as described above within the principle and scope of the invention as expressed in the appended claims.

I claim:

1. The method for connecting together the ends of sections of a member subject to contraction and expansion which method comprises shaping a tubular element in accordance with the perimeter of the ends of the sections of the member and securing the ends thereof together to form an endless tubular element, securing the tubular element so formed to the adjacent ends of the sections of the member, and cutting the wall of the tubular element between its connections to the adjacent ends of the sections of the member.

2. The method for connecting together the ends of sections of a member subject to contraction and expansion which method comprises shaping a tubular element in accordance with the perimeter of the ends of the sections of the member and securing the ends together to form an endless tubular element, welding the tubular element so formed to the adjacent ends of the sections of the member, and cutting through the wall of the tubular element between its connections to the adjacent ends of the sections of the member.

3. The method for connecting together the ends of sections of a cylindrical member subject to contraction and expansion which method comprises coiling a tubular element in the form of a helix having an internal diameter substantially equal to the diameter of the cylindrical member, separating a convolution of the helical element and connecting the ends together to form an endless tubular element, welding the endless tubular element so formed to the adjacent ends of the sections of the member, and cutting the wall of the tubular element between its connections to the adjacent ends of the sections of the members.

4. A method for connecting together the ends of sections of the shell of a heat exchanger which comprises shaping a tubular element in accordance with the perimeter of the adjacent ends of the sections of the shell and securing the ends thereof together to form an endless tubular element, securing the tubular element so formed to the adjacent ends of the sections of the shell, cutting the wall of the tubular element between its connections to the adjacent ends of the sections of the shell, contracting the tubular element and securing the tubes in the heat exchanger while the tubular element is contracted.

HOWARD C. DAVIS.